US010879743B2

United States Patent
Vocke et al.

(10) Patent No.: US 10,879,743 B2
(45) Date of Patent: Dec. 29, 2020

(54) FOREIGN OBJECT DETECTION IN INDUCTIVE POWER TRANSFER FIELD

(71) Applicant: Apple Inc., Cupertino, CA (US)

(72) Inventors: Sander Vocke, Auckland (NZ); Tom Vocke, Auckland (NZ)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/372,299

(22) Filed: Apr. 1, 2019

(65) Prior Publication Data

US 2019/0229561 A1 Jul. 25, 2019

Related U.S. Application Data

(63) Continuation of application No. 15/320,606, filed as application No. PCT/NZ2015/050072 on Jun. 11, 2015, now abandoned.

(51) Int. Cl.
*H02J 50/60* (2016.01)
*H02J 50/12* (2016.01)

(52) U.S. Cl.
CPC ............. *H02J 50/60* (2016.02); *H02J 50/12* (2016.02)

(58) Field of Classification Search
CPC . H02J 5/005; H02J 7/025; H02J 17/00; B60L 53/12–126; H01F 38/14
See application file for complete search history.

(56) References Cited

U.S. PATENT DOCUMENTS

| 7,812,481 B2 | 10/2010 | Iisaka et al. |
| 8,310,107 B2 | 11/2012 | Jin |
| 2005/0068019 A1 | 3/2005 | Nakamara et al. |
| 2007/0228833 A1 | 10/2007 | Stevens et al. |
| 2013/0027078 A1 | 1/2013 | Nakano et al. |
| 2013/0030892 A1 | 1/2013 | Liu et al. |
| 2013/0093257 A1 | 4/2013 | Goto |
| 2013/0099592 A1 | 4/2013 | Abe |
| 2013/0119773 A1 | 5/2013 | Davis |
| 2013/0127259 A1 | 5/2013 | Lohr et al. |

(Continued)

FOREIGN PATENT DOCUMENTS

| CN | 1954472 A | 4/2007 |
| CN | 103782485 A | 5/2014 |

(Continued)

OTHER PUBLICATIONS

"AC power", Apr. 2, 2014, Wikipedia, Retrieved via Wayback machine at <https://web.archive.org/web/20140402171111/https://en.wikipedia.org/wiki/AC_power>. (Year: 2014).*

*Primary Examiner* — Rexford N Barnie
*Assistant Examiner* — David A Shiao
(74) *Attorney, Agent, or Firm* — Blank Rome LLP

(57) ABSTRACT

A method for determining the presence of a foreign object in an inductive power transfer field in which control circuitry of an inductive power system performs the steps of: providing power to a direct current to alternating current converter; providing power from the converter to a transmitter coil in the inductive power transfer field; waiting for the current in the transmitter coil to stabilize; estimating the reactive power in the transmitter coil; estimating the real power in the transmitter coil; and using the estimated reactive power and estimated real power to determine whether a foreign object is present.

16 Claims, 2 Drawing Sheets

(56) References Cited

U.S. PATENT DOCUMENTS

| | | |
|---|---|---|
| 2013/0154557 A1 | 6/2013 | Lee et al. |
| 2014/0091634 A1 | 4/2014 | Mayo et al. |
| 2014/0091755 A1 | 4/2014 | Walley et al. |
| 2014/0197687 A1 | 7/2014 | Lin |

FOREIGN PATENT DOCUMENTS

| | | |
|---|---|---|
| EP | 2017940 A2 | 1/2009 |
| EP | 2600483 | 6/2013 |
| EP | 2602908 A1 | 6/2013 |
| EP | 3127215 A1 | 2/2017 |
| JP | 2006230129 A | 8/2006 |
| JP | 2008236917 A | 10/2008 |
| JP | 2009112137 | 5/2009 |
| JP | 2009112137 A | 5/2009 |
| JP | 2009222433 A | 10/2009 |
| JP | 2010034080 A | 2/2010 |
| JP | 2010508007 A | 3/2010 |
| JP | 2013074730 A | 4/2013 |
| JP | 2013123306 A | 6/2013 |
| JP | 2013171379 A | 9/2013 |
| JP | 2015008554 A | 1/2015 |
| WO | 89/10030 | 10/1989 |
| WO | 8910030 A1 | 10/1989 |
| WO | 2005109598 A1 | 11/2005 |
| WO | 2008137996 A1 | 11/2008 |
| WO | 2013012088 A1 | 1/2013 |
| WO | 2013038808 | 3/2013 |
| WO | 2013122483 A1 | 8/2013 |
| WO | 2013165261 A2 | 11/2013 |
| WO | 2014060871 A1 | 4/2014 |
| WO | 2014083015 A1 | 6/2014 |

\* cited by examiner

FOREIGN OBJECT DETECTION IN INDUCTIVE POWER TRANSFER FIELD

This application is a continuation of U.S. patent application Ser. No. 15/320,606, filed Dec. 20, 2016, which is a 371 U.S.C. 371 national stage application of international application No. PCT/NZ2015/050072, filed Jun. 11, 2015, which claims the benefit of Serial No. 626547, filed in New Zealand on Jun. 20, 2014, all of which are hereby incorporated by reference herein in their entireties.

FIELD OF THE INVENTION

The present invention is in the field of inductive power transfer systems. More particularly, although not exclusively, the invention relates to a method and system for detecting foreign objects present on an inductive power transfer surface and in particular to foreign objects located between an inductive power transfer surface and a receiver.

BACKGROUND OF THE INVENTION

Inductive power transfer systems are used to wirelessly provide power from a transmitter device to a receiver. This technology is now being used in wireless charging pads for handheld devices. Typically, a primary side or transmitter generates a time-varying magnetic field with a transmitting coil or coils. This magnetic field induces an alternating current in a suitable receiving coil or coils that can then be used to charge a battery, or power a device or other load. In some instances, the transmitter coil(s) or the receiver coil(s) may be connected to capacitors to create a resonant circuit, which can increase power throughput or efficiency at the corresponding resonant frequency.

A common problem with inductive power transfer systems is controlling when the transmitter should be powered and when the transmitter should be switched off. A further problem arises when a non-receiver (a foreign object) is brought into the range of the transmitter, and an unwanted current (and therefore heat) is induced therein. These non-receivers are typically known as parasitic loads. Further, a conducting foreign object may be located between the transmitter and a compatible receiver. Transmitting in this instance may result in damage to the transmitter and/or receiver.

Automatic systems for the detection of foreign objects have been described in the conventional art. For example:
- systems that rely on an additional coil in the transmitter side for foreign object detection
- systems that use a detection circuit to detect a higher harmonic of the transmitter coil frequency
- systems incorporated into a receiver Many of the systems for foreign object detection rely on additional detection circuitry. The drawback of this is that it adds cost and bulk to inductive power transfer systems. Many of the systems for foreign object detection also rely on power transfer occurring in a resonant circuit and may not be effective in non-resonant power transfer. Receiver based systems rely on every possible receiver being equipped for foreign object detection. Further receiver based systems can only detect foreign objects between a transmitter and the receiver.

It is an object of the invention to provide an improved or alternative method and system for foreign object detection in an inductive power transfer field, or to at least provide the public with a useful choice.

SUMMARY OF THE INVENTION

According to one exemplary embodiment there is provided a method for determining the presence of a foreign object in an inductive power transfer field in which control circuitry of an inductive power system performs the steps of: providing power to a direct current to alternating current converter, providing power from the converter to a transmitter coil in the inductive power transfer field, waiting for the current in the transmitter coil to stabilize, estimating the reactive power in the transmitter coil, estimating the real power in the transmitter coil, and using the estimated reactive power and estimated real power to determine whether a foreign object is present.

According to another exemplary embodiment there is provided an inductive power transfer device comprising: a converter adapted to be electrically connected to a power supply and adapted to output alternating current to a transmitter coil, a controller for controlling the frequency of the converter output alternating current, at least one transmitter coil adapted to receive alternating current from the converter and further adapted to generate a time-varying magnetic field with predetermined frequency and strength, at least one sensor adapted to sense features of the inductive power transfer device voltage and current from which estimates of real and reactive power though the transmitter coil can be made and provide sensor output to the controller, said controller configured to: control the supply of power to the transmitter coil, receive signals from the sensor as to current flow through the transmitter coil, determine when the current in the transmitter coil has reached a steady state condition, receive sensor output from the sensor of features of the inductive power transfer device voltage and current, estimate the real and reactive power in the transmitter coil from the sensor output received from the sensor, and determine whether a foreign object is present based on the estimated real and reactive power.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components which the use directly references, and possibly also of other non-specified components or elements.

Reference to any prior art in this specification does not constitute an admission that such prior art forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION OF EMBODIMENTS OF THE INVENTION

Figure 1:
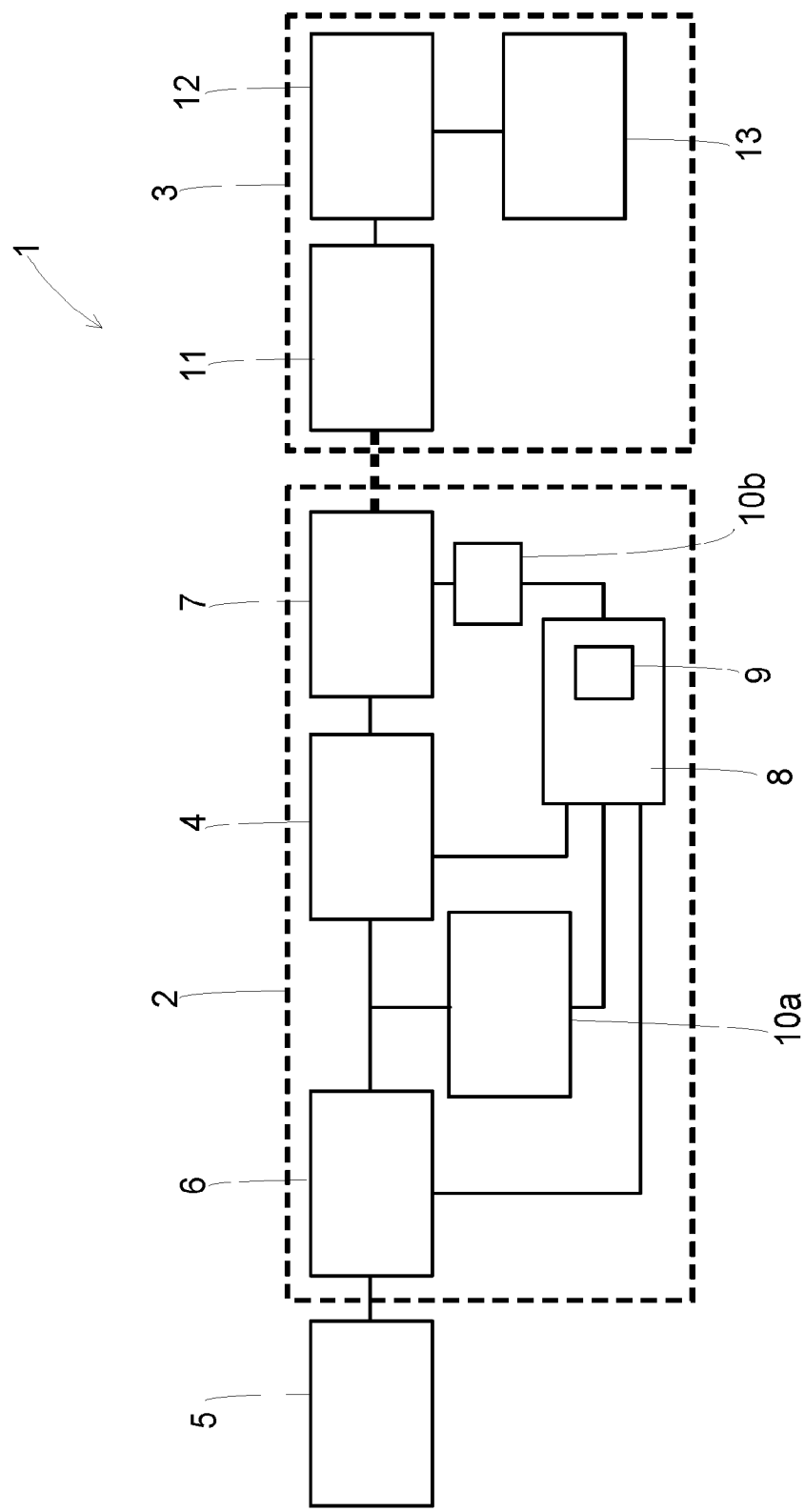
FIG. 1 shows a block diagram of an inductive power transfer system.

Embodiments of the present invention relate to method for detecting or identifying a foreign object in an inductive power transfer system. FIG. 1 is a block diagram shown a general representation of an inductive power transfer system 1. The inductive power transfer system includes a transmitter 2 and a receiver 3. The transmitter includes a DC-AC converter 4 that is electrically connected to an appropriate power supply 5, such as Mains power. In FIG. 1 this is shown as converter 4 being connected to a DC-DC converter 6 that is in turn connected to the DC power supply 5. The converter 4 may be a non-resonant half bridge converter or other converter adapted for the particular inductive power transfer system, such as a push-pull converter. The converter 4 is configured to output an alternating current of desired frequency and amplitude to one or more transmitting inductors 7. The voltage of the output of the converter may also be regulated by the converter 4, the DC-DC converter or combination of both.

The transmitting inductor(s) 7 may be a suitable configuration of one or more coils or other electrically reactive components which provide an inductance, depending on the characteristics of the magnetic field that are required in a particular application and the particular geometry of the transmitter. In some inductive power transfer system, the transmitting inductors may be connected to reactive components, such as capacitors, (not shown) to create a resonant circuit. The transmitting coil(s) receive alternating current from the converter 4 and generate a time-varying magnetic field. The frequency and strength of the magnetic field are controlled by the controller. Each transmitter coil may be individually operated.

FIG. 1 also shows control circuitry or a controller 8 of the transmitter 2. The controller can be directly or indirectly connected to the various components (blocks) of the transmitter. The controller receives inputs from the connected parts of the transmitter and produces an output that controls the way those parts of the transmitter operate. The controller may include or have access to electronic storage 9. In preferred embodiments the electronic storage is an on-board memory. The controller may be a programmable logic controller that is programmed to perform different computational tasks depending on the requirements of the inductive power transfer system.

In addition to the features of the inductive power transfer system 1 outlined thus far, FIG. 1 further shows representations of sensors 10a and 10b for sensing particular operating characteristics of the transmitter 2. It is understood that the sensors 10a and 10b may be connected to other or different parts of the transmitter than as depicted, be provided as a single integrated sensor, or as more than two distributed sensors, depending on the characteristics being sensed. The invention is not limited in this respect. In FIG. 1, the sensor 10a is shown connected to the junction between the DC-DC converter 6 and the DC-AC converter 4, which is appropriate for measuring the current supplied to the converters, and the sensor 10a is shown connected to the transmitting inductor(s) 7, which is appropriate for measuring the current through, or voltage over, the inductor(s) 7. However, the sensors 10a and 10b may be alternatively or additionally adapted to sense the required characteristics elsewhere in the transmitter system.

In embodiments of the invention discussed later sensors for making different types of measurements are discussed. Those skilled in the art appreciate that there are many possible types of sensors that are adapted for the sensing described and the invention is not limited in this respect. It will be understood that an appropriate sensor will be used for the sensing depending upon the required functionality.

Returning to FIG. 1, the receiver 3 includes one or more receiving inductors 11 provided as a suitable configuration of one or more coils or other electrically reactive components which provide an inductance, that are suitably connected to receiver circuitry 12 that in turn supplies received power to a load 13. The load may be, for example, a rechargeable battery. The receiver circuitry converts the induced current into a form that is appropriate for the load. In some inductive power transfer systems, the receiving inductors may be connected to reactive components, such as capacitors, (not shown) to create a resonant circuit.

The receiver may also include control circuitry either as part of the receiver circuitry 12 or as one or more separate components (not shown) for disabling current to flow into the receiver load, effectively "disconnecting" the load from the system 1. This control circuitry may also generate a start-up sequence including a time delay prior to enabling current to flow into the load, or wait for a signal from the transmitter prior to enabling current to flow into the load. This functionality may be implemented by any suitable means, such as a series electronic switching device between the load and the rest of the system.

There will now be described several embodiments of methods for detecting foreign objects in an inductive power transfer field, or for detecting receivers. Although these methods will be described in relation to the inductive power transfer system 1 described in relation to FIG. 1, it will be understood that the methods may be adapted to work with any number of appropriate inductive power transfer system configurations, and similarly inductive power transfer systems may be adapted to work with these methods, and the invention is not limited in this respect. In this description the following definitions apply: 'real power' is defined as the total average power being dissipated in the system, plus any power flowing into the receiver's load; 'reactive power' is defined as the average power that is flowing back and forth between energy storage devices (such as capacitors and inductors) in the system, without being dissipated; and 'apparent power' is defined as the product of the root mean square current going into the system and the root mean square voltage going into the system. In all of these definitions, the "system" is anything after the point at which a measurement is being made, e.g., when measurement is at the input of the DC-AC converter, anything that comes before is not included in the "system".

Further, in this description the following is to be understood. In a non-resonant "hard-driven" inductive power transmitter circuit the voltage on the transmit coil is substantially a square wave and the current through the coil is substantially a triangular wave. The difference between a non-resonant and a resonant inductive power transmitter circuit, as the terms are commonly used in the field of inductive power transfer (as opposed to their strict technical definitions), is as follows. A series circuit having a transmitter conductor and a capacitor may be resonant or non-resonant depending on the values of the inductor and the capacitor, and the driving frequency. In a resonant transmitter circuit, the reactance of the inductor and capacitor are the same order of magnitude resulting in substantially sinusoidal waveforms with a variable phase difference. In a non-resonant transmitter circuit, the reactance of the capacitor is of a lower order of magnitude than that of the inductor, and the resulting waveforms resemble a square wave (voltage) and a triangular wave (current) with no fixed phase relationship.

Real and Reactive Power: Measurements

Figure 2:
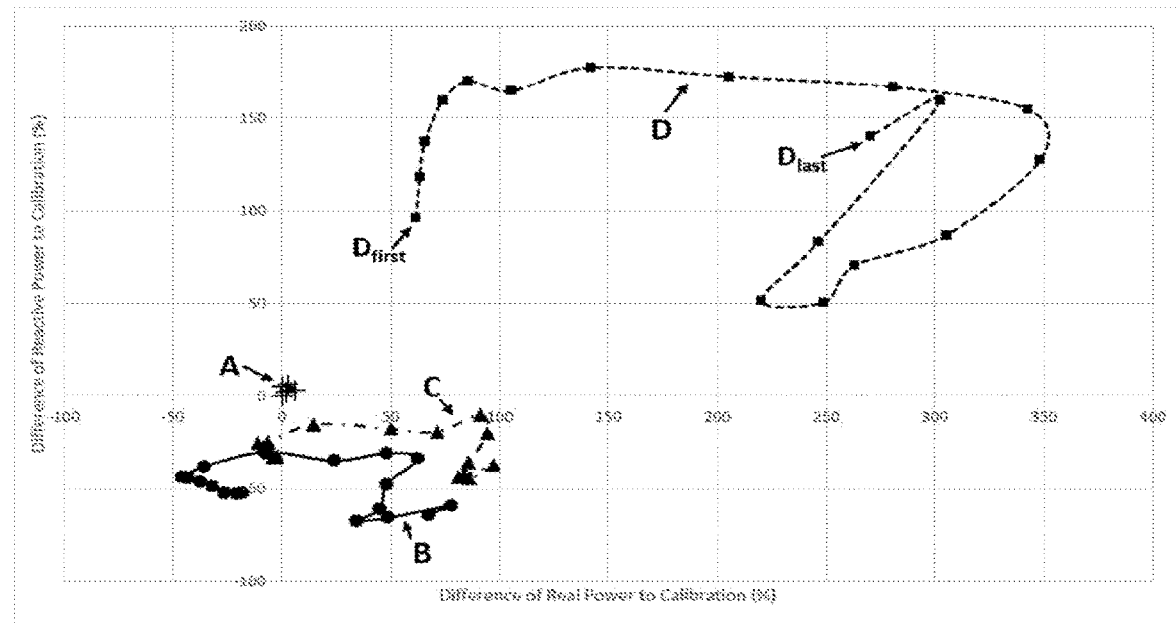
FIG. 2 shows the resulting shapes of four frequency sweeps with and without a foreign object and/or a receiver present.

FIG. 2 shows the results in curves or shapes (these terms are used synonymously and interchangeably herein) A, B, C and D of estimating real and reactive power at a plurality of frequencies with and without foreign objects present. Prior to obtaining measurements a calibration value for both real and reactive power is stored. The origin of the graph represents a 0% offset from the calibration value for that frequency. If all frequencies measured have the same values as the respective calibration measurements then all the measurement points are at the origin. The x axis is the percentile difference between the real power and its respective calibration measurement at that frequency. The y axis is the percentile difference between the reactive power and its respective calibration measurement at that frequency. A plurality of measurements can be made at a plurality of frequencies. Each of the data sets are plotted with their points connected by a curve. Thus every curve is a data set of measurements at different frequencies. Every point in the curve is a measurement at a different frequency, but with the same placement of objects in the field. The points are connected by a curve in ascending order of frequency. In curve D of FIG. 2, $D_{first}$ and $D_{last}$ represent the lowest and highest measurement frequency for curve D, respectively.

In FIG. 2:
curve A shows a data set that may typically be measured when doing the real and reactive power measurements at a plurality of frequencies, with no objects whatsoever in the transmitter field. As expected, the measurements are virtually equal to their respective calibration values (which is why the points appear close to 0% displacement from their calibrations on both axes);

curve B is an example of a curve that may be measured when a receiver is in the transmitter field. In the case observed, the result is that the reactive power is lower than the calibration value by various amounts at different frequencies, and the real power is either lower or higher, depending on the frequency. These offsets are highly dependent on the specific ferrites, coil designs and circuits used, their frequency responses and the exact receiver positioning; and curves C and D are examples of curves that may be measured when a foreign metal object is positioned between the receiver and the transmit coil(s). In these cases, they can be seen to have the same general shape as curve B, but the average real and reactive powers are higher. Also, the difference in real and reactive powers over frequency may be increased. These differences are highly dependent on the specific ferrites, coil designs and circuits used, their frequency responses and their exact positioning—and the material, geometry and positioning of the foreign metal object as well. Curve D corresponds to a bigger foreign object than curve C, resulting in bigger differences in average and size compared to curve B, than curve C.

It can clearly be seen from FIG. 2 that the curves for foreign objects are offset from those for non-foreign objects in both spread size and average value. The offset difference is in part dependent on the degree of overlap of the foreign object on the coil(s), for example, when the foreign object only partially overlaps a coil the difference is reduced.

Figure 3:
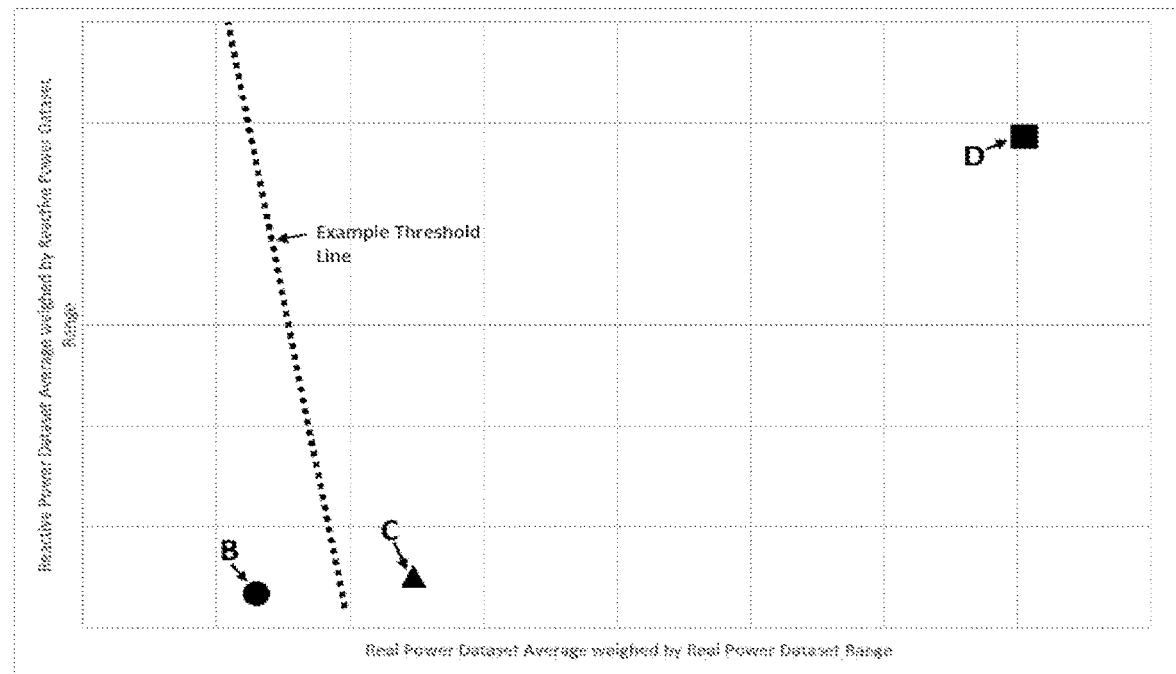
FIG. 3 shows the results gained when the centre of the shapes B, C and D depicted in FIG. 2, weighted by the total area of the respective shapes, are plotted.

FIG. 3 shows the results gained when characteristics of the shapes from FIG. 2 are used for foreign object determination. Using the data sets associated with these shapes, the averages and sizes of the shapes can be evaluated. Averages are then the average percentile offset from the respective calibration. Sizes are the difference between maximum and minimum offset from the respective calibration. This is evaluated separately for the real and reactive parts so the results are plotted on separate axes in FIG. 3. The averages are weighted by the sizes. Curves B, C and D in FIG. 2 are each represented by a single point in FIG. 3 as points B, C and D, respectively. These points can then be compared to a threshold determined or pre-set for foreign object detection. The dotted line in FIG. 3 is an example of a threshold that would, in the case presented, separate the foreign object situations (points C and D) from the non-foreign object situation (point B).

This method could also be used for foreign object detection in the absence of a receiver. Based on these measured relationships and characteristics of foreign objects and IPT receivers, different measurement regimes may be used to detect the presence of foreign objects. Examples of such regimes are now described.

Real and Reactive Power: Average and Peak Current

A transmitter may begin foreign object detection when the presence of a potential receiver is detected. A receiver may be brought into proximity with the transmitter prior to commencing foreign object detection. The detection of the presence of a potential receiver can be performed in a number of ways, for example, the various methods and systems described in PCT Publication No. WO 2013/165261, the entire contents of which are hereby incorporated by reference, may be used.

In embodiments of the invention the receiver is configured to commence a charging start-up mode when the receiver detects the presence of a transmitter and prior to being charged by the transmitter. In this mode the receiver runs in a substantially no-load condition, as the receiver keeps the output load disconnected. In this condition there may still be the load of the receiver controller circuitry itself. This condition may continue for a set period or until a signal is received from the transmitter to cease the start-up mode. The transmitter performs foreign object detection during the start-up mode. The transmitter may send the signal once foreign object detection is completed and if no foreign object is detected. Once the predetermined period expires, or a signal is received from the transmitter, the receiver begins charging and the load is connected to the receiver coil(s).

When the transmitter is in foreign object detection mode, the controller controls the converter so that it supplies the inductor with alternating current at one or more test frequencies. Typically the test frequencies are of the same order of magnitude as (and may include) the power transfer frequency used by the inductive power transfer system.

Upon supplying the current at the test frequency(s) the controller waits for a predetermined period for the current to stabilize within the transmitter coils in foreign object detection mode. The controller may also wait for current to stabilize within the receiver. For example, the predetermined period is typically approximately 50 milliseconds.

The sensor 10a is configured to sense the average direct current into the converter 4 (prior to DC to AC conversion). The output from the sensor is provided to the controller. The product of the average direct current into the DC to AC converter 4 with the power supply voltage provides an estimate of the average real power in the transmitter coil.

The controller controls one or more sensors (e.g., the sensor 10b) to sense the peak alternating current through the transmitter coils and the peak voltage across the transmitter coils. In some embodiments the peak voltage may be fixed, and therefore the known peak voltage need not be sensed.

The controller combines these values into an estimate of the reactive power. In a preferred embodiment the reactive power in the transmitter coil is estimated as $$P_{REACTIVE} = \frac{1}{\sqrt{3}} I_{pk} V_{pk},\qquad \text{Equation (1)}$$

where $I_{pk}$ is the peak current through the transmitter coil(s) in Amperes and $V_{pk}$ is the peak voltage across the transmitter coil in Volts. For example, the controller may be a microprocessor, an FPGA, other digital logic device or an analog discrete multiplier/integrator.

The estimated reactive power provides a close estimate of the reactive power as the current relating to reactive power is dominant over the current relating to real power through the transmitter coil where the current is measured. This holds as long as little or no real power is being drawn by the receiver.

The real and reactive power estimates may be performed at one test frequency or over a plurality or sweep of frequencies and combined into a data set for further analysis. The plurality of frequencies are not limited to the charging or operating frequency of the transmitter.

When the receiver is in a substantially no-load condition the real and reactive power of the receiver will depend on the receiver's mechanical or material design (for example, proportionate use of ferromagnetic material, e.g., ferrite, metal, etc.), position (for example, distance from and degree of overlap with the transmitter coil), the receiver circuitry itself and the presence of any foreign object(s). As opposed to during charging, when no load is present (i.e., disconnected) the real and reactive power are not substantially dependent on the receiver's load.

Once the real power and the reactive power in the transmitter coil(s) are estimated the controller determines whether a foreign object is present. This determination can be by any suitable means, including but not limited to: comparing estimated values to threshold values stored in electronic storage, comparing the estimated values to calibration values stored in electronic storage, determining a shape of the estimated values or a characteristic of the estimated values and comparing this to a threshold or expected value. While the data set may be viewed as a shape (see FIG. 2; discussed in detail later) the transmitter controller mathematically evaluates the data set to determine a characteristic of the data set. For example, average value and centre can be determined directly from the data set. Those skilled in the art will be aware that other characteristics can be determined directly from the data set.

In an embodiment calibration values of real and reactive power for each transmitter coil with no load and with no foreign object present are stored in the inductive power transfer system memory and accessed by the controller for comparison purposes. Calibration values for real and reactive power for each transmitter coil may be stored in the electronic storage for a plurality of frequencies. Preferably these frequencies include the test frequencies. The presence of a foreign object may be determined by comparing the estimated real and reactive power through the transmitter coil(s) to the calibration values.

If a foreign object is assumed to be metal then the difference between the estimate points and their respective calibration values or expected non-foreign object values would increase with the foreign object being introduced. However, there are other influences that make the situation more complex. One of these influences is the receiver ferrite. At low receiver loads, the ferrite may cancel out the change in reactive and/or real power caused by foreign metal. The influence for the receiver ferrite at low loads may be just as large, or larger than, that of the metal (foreign object) in between. It also means that the curve seen when multiple frequencies are measured is not always linear or close to linear. Ferrite, or more generally ferromagnetic material is typically provided in the receiver in association with the receiver coil(s) in order to augment the induced magnetic field and increase the amount of power coupled from the transmitter coil(s).

Repeating the real and reactive power estimates over a plurality of frequencies allows the response to be more closely determined. As previously stated the estimates can be combined into a data set for further analysis. The estimates over a plurality of frequencies may form a curve. The controller may evaluate the data set and find a characteristic of the shape to determine whether or not a foreign object is present. For example, the size, average value or centre of the shape as evaluated from the data set.

Real and Reactive Power: Waveform Sampling and Processing

A transmitter may begin foreign object detection when the presence of a potential receiver is detected. A receiver may be brought into proximity with the transmitter prior to commencing foreign object detection. In embodiments of the invention the receiver is configured to commence a charging start-up mode when the receiver detects the presence of a transmitter and prior to being charged by the transmitter. In this mode the receiver runs in a substantially no-load condition, as the receiver keeps the output load disconnected. In this condition there may still be the load of the receiver controller circuitry itself. This condition may continue for a set period or until a signal is received from the transmitter to cease the start-up mode. The transmitter performs foreign object detection during the start-up mode. The transmitter may send the signal once foreign object detection is completed and if no foreign object is detected. Once the predetermined period expires, or a signal is received from the transmitter, the receiver begins charging and the load is connected to the receiver coil(s).

When the transmitter is in foreign object detection mode the controller controls the converter so that it supplies the inductor with alternating current at one or more test frequencies. Typically the test frequencies are of the same order of magnitude as (and may include) the power transfer frequency used by the inductive power transfer system.

Upon supplying the current at the test frequency(s) the controller waits for a predetermined period for the current to stabilize within the transmitter coils in foreign object detection mode. The controller may also wait for current to stabilize within the receiver. The predetermined period is typically approximately 50 milliseconds.

The controller controls one or more sensors (e.g., the sensor 10b) to sample the instantaneous voltage and current through the transmitter coil. The output from the sensor(s) is provided to the controller. Multiple samples of the instantaneous voltage over the transmitter coil(s) and the total instantaneous current through the transmitter coil(s) are taken for every cycle of their periodic waveforms, and stored. This process is referred to herein as "sampling the waveforms". At least one entire period of the voltage waveform and one entire period of the current waveform are sampled by the sensor(s). Either an integer number of periods of the current and voltage waveforms is sampled or a large number of periods of the voltage and current waveforms are sampled so that an integer number of periods is not essential.

To estimate the real power in the transmitter coil, the controller multiplies the voltage and current waveforms together and the product of the multiplication is integrated. The real power is estimated as the result of the integration divided by the time over which the waveform was sampled.

To estimate the reactive power in the transmitter coil(s) the controller first determines an estimate of the apparent power. The apparent power is the product of the root mean square (RMS) values of the current and voltage. The controller calculates the root mean square values of the sampled voltage and current waveforms. One skilled in the art will appreciate that these values are easily calculated from the sampled voltage and current waveforms using integration or other suitable techniques. The estimated reactive power has a Pythagorean relationship with the estimated apparent power and the estimated real power, as in the following equation (with all powers in Watts):

$$P_{REACTIVE} = \sqrt{P_{APPARENT}^2 - P_{REAL}^2} \qquad \text{Equation (2).}$$

In embodiments the real and reactive power estimates are performed at one test frequency or over a plurality or sweep of frequencies and combined into a data set for further analysis. The plurality of frequencies are not limited to the charging or operating frequency of the transmitter.

When the receiver is in a substantially no-load condition the real and reactive power of the receiver will depend on the receiver's mechanical or material design (for example, proportionate use of ferromagnetic material, e.g., ferrite, metal, etc.), position (for example, distance from and degree of overlap with the transmitter coil), receiver circuitry and presence of any foreign object(s). As opposed to during charging, when no load is present (i.e., disconnected), the real and reactive power are not substantially dependent on the receiver's load.

Once the real power and the reactive power in the transmitter coil(s) are estimated the controller determines whether a foreign object is present. This determination can be by any suitable means, including but not limited to: comparing estimated values to threshold values stored in electronic storage, comparing the estimated values to calibration values stored in electronic storage, determining a shape of the estimated values or a characteristic of the estimated values and comparing this to a threshold or expected value. While the data set may be viewed as a shape (see FIG. 2) the transmitter controller mathematically evaluates the data set to determine a characteristic of the data set. For example, average value and centre can be determined directly from the data set. Those skilled in the art will be aware that other characteristics can be determined directly from the data set.

In an embodiment calibration values of real and reactive power for each transmitter coil with no load and with no foreign object present are stored in the inductive power transfer system memory and accessed by the controller for comparison purposes. Calibration values for real and reactive power for each transmitter coil may be stored in the electronic storage for a plurality of frequencies. Preferably these frequencies include the test frequencies. The presence of a foreign object may be determined by comparing the estimated real and reactive power through the transmitter coil(s) to the calibration values.

If a foreign object is assumed to be metal then the difference between the estimate points and their respective calibration values or expected non-foreign object values would increase with the foreign object being introduced. However, there are other influences that make the situation more complex. One of these influences is the receiver ferrite. At low receiver loads, the ferrite may cancel out the change in the reactive and/or real power caused by foreign metal. The influence of the ferrite at low loads may be just as large, or larger than, that of the metal (foreign object) in between. It also means that the curve seen when multiple frequencies are measured is not always linear or close to linear. Ferrite, or more generally ferromagnetic material is typically provided in the receiver in association with the receiver coil(s) in order to augment the induced magnetic field and increase the amount of power coupled from the transmitter coil(s).

Repeating the real and reactive power estimates over a plurality of frequencies allows the response to be more closely determined. As previously stated the estimates can be combined into a data set for further analysis. The estimates over a plurality of frequencies may form a shape. The controller may evaluate the data set and find a characteristic of the shape to determine whether or not a foreign object is present. For example the size, average value or centre of the shape as evaluated from the data set.

Real and Reactive Power: Amplitude and Phase Measurement

A transmitter may begin foreign object detection when the presence of a potential receiver is detected. A receiver may be brought into proximity with the transmitter prior to commencing foreign object detection. In embodiments of the invention the receiver is configured to commence a start-up mode that commences when the receiver detects the presence of a transmitter and prior to being charged by the transmitter. In this mode the receiver runs in a substantially no-load condition, as the receiver keeps the output load disconnected. In this condition there may still be the load of the receiver controller circuitry itself. This condition may continue for a set period or until a signal is received from the transmitter to cease the start-up mode. The transmitter performs foreign object detection during the start-up mode. The transmitter may send the signal once foreign object detection is completed and if no foreign object is detected. Once the predetermined period expires, or a signal is received from the transmitter, the receiver begins charging and the load is connected to the receiver coil(s).

When the transmitter is in foreign object detection mode the controller controls the converter so that it supplies the inductor with alternating current at one or more test frequencies. Typically the test frequencies are of the same order of magnitude as (and may include) the power transfer frequency used by the inductive power transfer system.

Upon supplying the current at the test frequency(s) the controller waits for a predetermined period for the current to stabilize within the transmitter coils in foreign object detection mode. The controller may also wait for current to stabilize within the receiver. The predetermined period is typically approximately 50 milliseconds.

The controller controls the sensor(s) to sense the amplitudes of the voltage and current through the transmitter coil(s) undergoing foreign object detection. The controller further controls a (further) sensor to sense the phase difference between the voltage and current waveforms.

In a resonant system it is likely that the voltage and current waveforms through the transmitter coil will be substantially sinusoidal. In this case the real power in Watts in the transmitter coil can be estimated by the controller as:

$$P_{REAL} = I_{pk} V_{pk} \cos(\theta) \qquad \text{Equation (3),}$$

where $V_{pk}$ is the peak voltage over the transmitter coil(s) in Volts, $I_{pk}$ is the peak total current through the transmitter coil(s) in Amperes and Θ is the phase difference between the voltage and current waveforms in radians.

The reactive power in the transmitter coil in Watts can be estimated by the controller as:

$$P_{REACTIVE} = I_{pk} V_{pk} \sin(\theta) \qquad \text{Equation (4),}$$

where the symbols are the same quantities as in the previous equation.

In practice the voltage and current waveforms may not be substantially sinusoidal. In this case Equations (3) and (4) for real and reactive power may require adjustment. One skilled in the art will be able to make suitable adjustments to the given formulas to account for changes in waveforms.

In embodiments the real and reactive power estimates are performed at one test frequency or over a plurality or sweep of frequencies and combined into a data set for further analysis. The plurality of frequencies are not limited to the charging or operating frequency of the transmitter.

When the receiver is in a substantially no-load condition the real and reactive power of the receiver will depend on the receiver's mechanical or material design (for example, proportionate use of ferromagnetic material, e.g., ferrite, metal, etc.), position (for example, distance from and degree of overlap with the transmitter coil), receiver circuitry and presence of any foreign object(s). As opposed to during charging, when no load is present (i.e., disconnected), the real and reactive power are now not substantially dependent on the receiver's load.

Once the real power and the reactive power in the transmitter coil(s) are estimated the controller determines whether a foreign object is present. This determination can be by any suitable means, including but not limited to: comparing estimated values to threshold values stored in electronic storage, comparing the estimated values to calibration values stored in electronic storage, determining a shape of the estimated values or a characteristic of the estimated values and comparing this to a threshold or expected value. While the data set may be viewed as a shape (see FIG. 2) the transmitter controller mathematically evaluates the data set to determine a characteristic of the data set. For example, average value and centre can be determined directly from the data set. Those skilled in the art will be aware that other characteristics can be determined directly from the data set.

In an embodiment calibration values of real and reactive power for each transmitter coil with no load and with no foreign object present are stored in the inductive power transfer system memory and accessed by the controller for comparison purposes. Calibration values for real and reactive power for each transmitter coil may be stored in the electronic storage for a plurality of frequencies. Preferably these frequencies include the test frequencies. The presence of a foreign object may be determined by comparing the estimated real and reactive power through the transmitter coil(s) to the calibration values.

If a foreign object is assumed to be metal then the difference between the estimate points and their respective calibration values or expected non-foreign object values would increase with the foreign object being introduced. However, there are other influences that make the situation more complex. One of these influences is the receiver ferrite. At low receiver loads, the ferrite may cancel out the change in reactive and/or real power caused by foreign metal. The influence of the receiver ferrite at low loads may be just as large, or larger than, that of the metal (foreign object) in between. It also means that the curve seen when multiple frequencies are measured is not always linear or close to linear. Ferrite, or more generally ferromagnetic material is typically provided in the receiver in association with the receiver coil(s) in order to augment the induced magnetic field and increase the amount of power coupled from the transmitter coil(s).

Repeating the real and reactive power estimates over a plurality of frequencies allows the response to be more closely determined. As previously stated the estimates can be combined into a data set for further analysis. The estimates over a plurality of frequencies may form a shape. The controller may evaluate the data set and find a characteristic of the shape to determine whether or not a foreign object is present. For example the size, average value or centre of the shape as evaluated from the data set.

It will be appreciated by one skilled in the art that there are numerous methods that may be used to estimate the real and reactive power through the transmitter coil(s). The embodiments described above are not intended to limit the invention. Other methods for estimating the real and reactive power may be used.

Further, whilst the description herein relates to performing foreign object or non-IPT receiver detection employing control circuitry of the IPT transmitter, the foreign object detection can be equally performed by control circuitry of the IPT receiver. In either case, the control circuitry of either or both of the IPT transmitter and receiver may be configured to ensure that inductive power transfer is only performed if no foreign object is detected, or if the type or location of foreign object detected is determined to not cause a potential problem in the inductive power transfer.

Further still, in the exemplary embodiments described the foreign object or non-IPT receiver detection is performed during a start-up or otherwise non-charging or power transfer stage of the operation of the IPT system or receiver. Those skilled in the art understand that the various methods described could be adapted to be performed at a particular time or times (e.g., intermittently) during charging or power transfer through temporary entry into a non-charging or power transfer stage so as to ensure that foreign object conditions have not changes since charging or power transfer has begun. Alternatively, or additionally, the methods described may be adapted to be performed during charging or power transfer.

Furthermore, the different exemplary methods of foreign object or non-receiver detection described may be performed singularly or in combination, either as a standalone foreign object detection test regime or in conjunction with one or more other foreign object detection tests in the applicable IPT system. Such singular or expanded foreign object detection test regimes could be performed in IPT systems using inductive coupling of single transmitter and receiver coils, so-called 1:1 systems or using inductive coupling of plural transmitter and receiver coils, so-called N:N systems.

It should be noted that in this specification the words sensing and measuring are applied interchangeably to the sensors. These terms are not meant to be limiting.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

What is claimed is:

1. A method for detecting a foreign object using a wireless power transmitter configured to provide wireless power to a wireless power receiver, wherein the wireless power transmitter comprises a controller and a transmitter coil, the method comprising:
providing alternating current to the transmitter coil;
with the controller, estimating reactive power in the transmitter coil associated with the alternating current provided to the transmitter coil;
with the controller, estimating real power in the transmitter coil associated with the alternating current provided to the transmitter coil; and
with the controller, determining whether the foreign object is present by comparing the estimated reactive power and the estimated real power to a foreign object detection threshold;
wherein the foreign object detection threshold lies in a real power versus reactive power space and wherein the foreign object detection threshold comprises a curve that separates a first region of the real power versus reactive power space from a second region of the real power versus reactive power space, the first region being associated with the presence of foreign objects, and the second region being associated with the absence of foreign objects.

2. The method of claim 1, wherein estimating reactive power comprises measuring peak current through the transmitter coil while the transmitter coil transmits the alternating current at least one frequency.

3. The method of claim 1, wherein the wireless power transmitter comprises a direct current to alternating current converter, the method further comprising:
with the direct current to alternating current converter, converting a direct current into the alternating current and providing the alternating current to the transmitter coil, wherein estimating real power comprises measuring the direct current and multiplying the measured direct current with a power supply voltage of the wireless power transmitter.

4. The method of claim 3, wherein estimating reactive power comprises, while the alternating current is provided to the transmitter coil, measuring peak current through the transmitter coil and measuring peak voltage across the transmitter coil.

5. The method of claim 4, wherein estimating reactive power further comprises multiplying the measured peak alternating current with the measured peak voltage.

6. The method of claim 1, further comprising:
with the controller and while the alternating current is provided to the transmitter coil, sampling an instantaneous current waveform and an instantaneous voltage waveform at the transmitter coil.

7. The method of claim 6, further comprising:
with the controller, generating an integration value by integrating a product of the sampled instantaneous current waveform and the sampled instantaneous voltage waveform, wherein estimating real power comprises dividing the integration value by a sampling time associated with the sampled instantaneous current waveform and the sampled instantaneous voltage waveform.

8. The method of claim 7, further comprising, with the controller:
calculating a first root mean square value of the sampled instantaneous voltage waveform;
calculating a second root mean square value of the sampled instantaneous current waveform; and
estimating an apparent power by multiplying the first root mean square value with the second root mean square value, wherein estimating reactive power comprises estimating reactive power based on the estimated real power and the estimated apparent power.

9. The method of claim 1, further comprising, with the controller:
measuring an amplitude of a voltage across the transmitter coil while the alternating current is provided to the transmitter coil;
measuring an amplitude of a current through the transmitter coil while the alternating current is provided to the transmitter coil; and
measuring a phase difference between a voltage waveform and a current waveform at the transmitter coil.

10. The method of claim 9, wherein estimating real power comprises estimating real power based on the measured amplitude of the voltage, the measured amplitude of the current, and a cosine of the measured phase difference.

11. The method of claim 10, wherein estimating reactive power comprises estimating reactive power based on the sensed amplitude of the voltage, the sensed amplitude of the current, and a sine of the phase difference.

12. The method of claim 9, wherein estimating reactive power comprises estimating reactive power based on the sensed amplitude of the voltage, the sensed amplitude of the current, and a sine of the phase difference.

13. The method of claim 1 wherein estimating real power comprises estimating real power at a plurality of frequencies of the alternating current and wherein estimating reactive power comprises estimating reactive power at the plurality of frequencies of the alternating current.

14. The method of claim 1, wherein estimating reactive power comprises estimating reactive power after the alternating current has stabilized in the transmitter coil, and wherein estimating real power comprises estimating real power after the alternating current has stabilized in the transmitter coil.

15. A wireless power transmitter configured to convey wireless power to a wireless power receiver and configured to detect a foreign object that is different from the wireless power receiver, the wireless power transmitter comprising:
a transmitter coil;
circuitry coupled to the transmitter coil and configured to supply an alternating current to the transmitter coil; and
control circuitry coupled to the transmitter coil and the circuitry, wherein the control circuitry is configured to:
estimate a reactive power associated with the alternating current supplied to the transmitter coil;
estimate a real power associated with the alternating current supplied to the transmitter coil; and
determine whether the foreign object is present by comparing the estimated reactive power and the estimated real power to a foreign object detection criterion;
wherein the foreign object detection criterion comprises a threshold curve in real power as a function of reactive power, the wireless power transmitter further comprising:
storage configured to store the threshold curve, the control circuitry being configured to determine whether the foreign object is present by comparing the estimated reactive power and the estimated real power to the threshold curve.

16. The wireless power transmitter of claim 15, wherein the control circuitry is configured to estimate the reactive power by, while the alternating current is supplied to the transmitter coil at at least one frequency, measuring a current through the transmitter coil and a voltage across the transmitter coil.

* * * * *

UNITED STATES PATENT AND TRADEMARK OFFICE
CERTIFICATE OF CORRECTION

PATENT NO. : 10,879,743 B2
APPLICATION NO. : 16/372299
DATED : December 29, 2020
INVENTOR(S) : Sander Vocke et al.

Page 1 of 1

It is certified that error appears in the above-identified patent and that said Letters Patent is hereby corrected as shown below:

In the Claims

Claim 2, at Column 13, Line 35, insert another -- at -- before -- least --

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*